United States Patent
Hill

(10) Patent No.: US 8,944,742 B2
(45) Date of Patent: Feb. 3, 2015

(54) MEANS FOR MOVING TRASH RECEPTACLES

(76) Inventor: Curt J. Hill, Warba, MN (US)

( * ) Notice: Subject to any disclaimer, the term of this patent is extended or adjusted under 35 U.S.C. 154(b) by 860 days.

(21) Appl. No.: 13/135,026

(22) Filed: Jun. 23, 2011

(65) Prior Publication Data

US 2012/0325876 A1 Dec. 27, 2012

(51) Int. Cl.
*B60R 9/06* (2006.01)
*B65F 1/14* (2006.01)

(52) U.S. Cl.
CPC ................. *B60R 9/06* (2013.01); *B65F 1/1452* (2013.01); *B65F 1/1468* (2013.01)
USPC .......................................................... 414/462

(58) Field of Classification Search
CPC ............ B60R 9/06; B60R 9/10; B60P 3/1025
USPC .................................................. 414/462–466
See application file for complete search history.

(56) References Cited

U.S. PATENT DOCUMENTS

| | | | | | |
|---|---|---|---|---|---|
| 5,961,272 | A | * | 10/1999 | Short | 414/462 |
| 6,033,178 | A | * | 3/2000 | Cummins | 414/462 |
| 6,164,896 | A | * | 12/2000 | Cummins | 414/462 |
| 6,698,995 | B1 | * | 3/2004 | Bik et al. | 414/462 |
| 7,101,142 | B2 | * | 9/2006 | Bik et al. | 414/462 |
| 2008/0101899 | A1 | * | 5/2008 | Slonecker | 414/462 |
| 2009/0028679 | A1 | * | 1/2009 | Smith | 414/462 |
| 2009/0101685 | A1 | * | 4/2009 | Robb | 224/495 |
| 2010/0272548 | A1 | * | 10/2010 | McKamey | 414/462 |

* cited by examiner

*Primary Examiner* — Saul Rodriguez
*Assistant Examiner* — Emery Hassan
(74) *Attorney, Agent, or Firm* — Dennis L. Thomte; Thomte Patent Law Office LLC

(57) ABSTRACT

A trash receptacle mover including a first quick-attach assembly secured to an off-road vehicle and a second quick-attach assembly connected to a trash receptacle attachment member. The quick-attach assemblies may be selectively connected together. The trash receptacle attachment member may be secured to a recessed bar on the trash receptacle so that the trash receptacle may be lifted from the ground and transported to a distant location.

4 Claims, 6 Drawing Sheets

MEANS FOR MOVING TRASH RECEPTACLES

BACKGROUND OF THE INVENTION

1. Field of the Invention

This invention relates to a means for moving large trash receptacles or bins from one location to another. More particularly, this invention relates to a device which is secured to the forward end or rearward of an off-road vehicle by a quick-attach assembly with the quick-attach assembly including means for connection to the trash receptacle.

2. Description of the Related Art

In rural areas, residents must bring their trash receptacles to a highway or main road which is some distance from the residence since the garbage trucks will not normally leave the main road or highway to collect trash from homes located some distance from the highway or main road. The residents must then either roll the trash receptacle to the point of collection or load the same onto a truck or trailer and then haul the trash receptacle to the point of collection. When the trash has been collected, the resident must then retrieve the empty trash receptacle from the point of collection by rolling the same back to the residence or by hauling the trash receptacle back to the residence with a truck or trailer. Since most trash receptacles used in rural areas are quite large, the task of taking the trash receptacles to the highway or main road and then retrieving the same after the trash has been collected therefrom is quite burdensome.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Applicant has developed a means for conveniently and easily moving trash receptacles to the point of collection and then retrieving the trash receptacles after the trash receptacles have been emptied.

The large trash receptacles or bins normally include a tub-like container, a hinged cover, wheels and a recessed lifting rod or shaft at one side thereof which is utilized to dump the contents of the receptacle into a garbage truck.

The invention disclosed herein is designed to be used in combination with an off-road vehicle such as an ATV, UTV, riding lawn mower or garden tractor. Although the invention herein may be used at either the rearward or forward ends of the off-road vehicle, the invention will be described as being mounted on the rearward end of the off-road vehicle.

A push tube assembly is provided which is pivotally mounted, about a horizontal axis, at the rearward end of the vehicle. A quick-attach assembly is secured to the rearward end of the push tube assembly and includes a front quick-attach assembly and a rear quick-attach assembly. The front quick-attach assembly includes horizontally spaced-apart first and second tubular members, having forward and rearward ends, extending therefrom. The rear quick-attach assembly has forward and rearward ends and includes a box-like housing having a forwardly presented pocket adapted to receive the first and second tubular members therein to enable the rear quick-attach assembly to be selectively secured to the front quick-attach assembly. A trash receptacle attachment member is secured to the rear quick-attach assembly for selective attachment to a trash receptacle. The trash receptacle attachment member includes means for engaging the lifting rod or shaft of the trash receptacle.

It is therefore a principal object of the invention to provide a means for moving trash receptacles from one location to another.

A further object of the invention is to provide a means for moving trash receptacles which includes a front quick-attach assembly secured to the rearward end of a push tube assembly secured to the off-road vehicle and a rear quick-attach assembly which is adapted to be selectively secured to the front quick-attach assembly with the rear quick-attach assembly having a trash receptacle attachment member secured thereto.

A further object of the invention is to provide a convenient means for moving a trash receptacle from a residence to a location remote from the residence such as a highway or main road.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
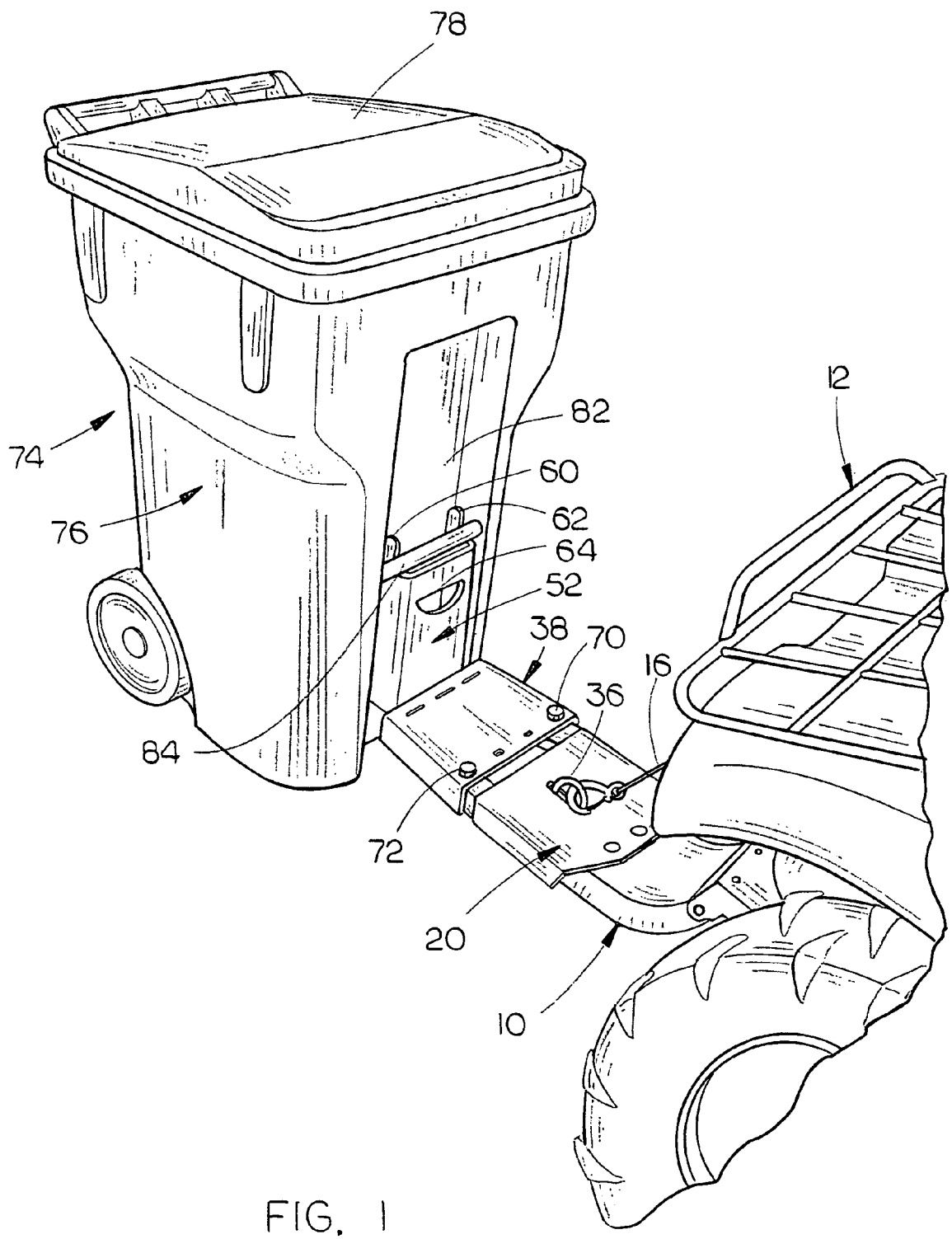
FIG. 1 is a perspective view illustrating the invention hereof being used to move a trash receptacle.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In FIGS. 1, 2, 5 and 6 of the drawings, the numeral 10 refers to a push tube assembly which may be mounted to an off-road vehicle 12 at either the forward or rearward ends thereof. The drawings illustrate that the push tube assembly 10 is pivotally mounted at the rearward end of the off-road vehicle which may be an ATV, UTV, riding mower or garden tractor. Vehicle 12 includes a winch 14 having a winch cable 16 associated therewith for raising and lowering the rearward end of the push tube assembly 10.

Figure 2:
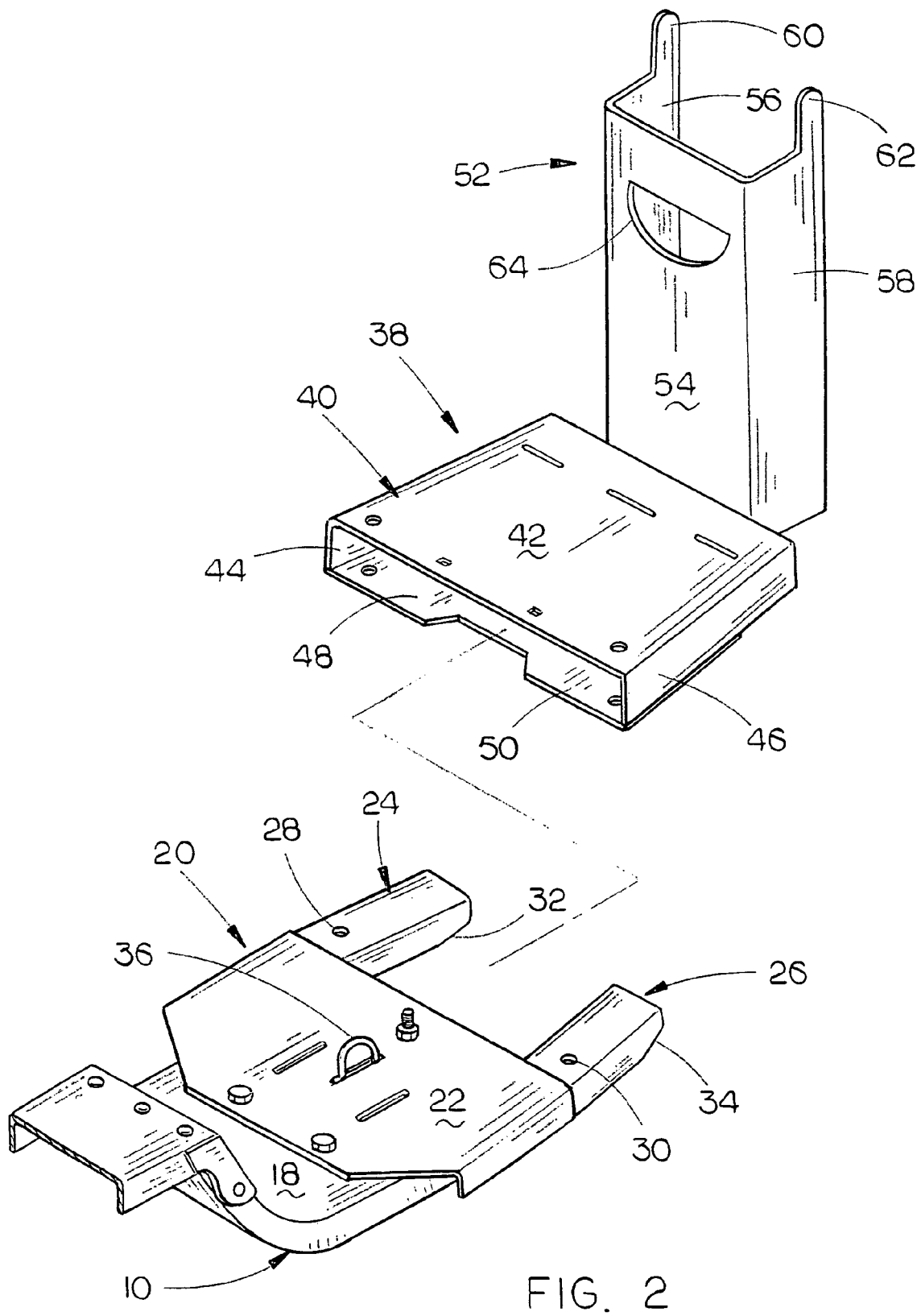
FIG. 2 is an exploded perspective view of the front and rear quick-attach assemblies of this invention.
Figure 3:
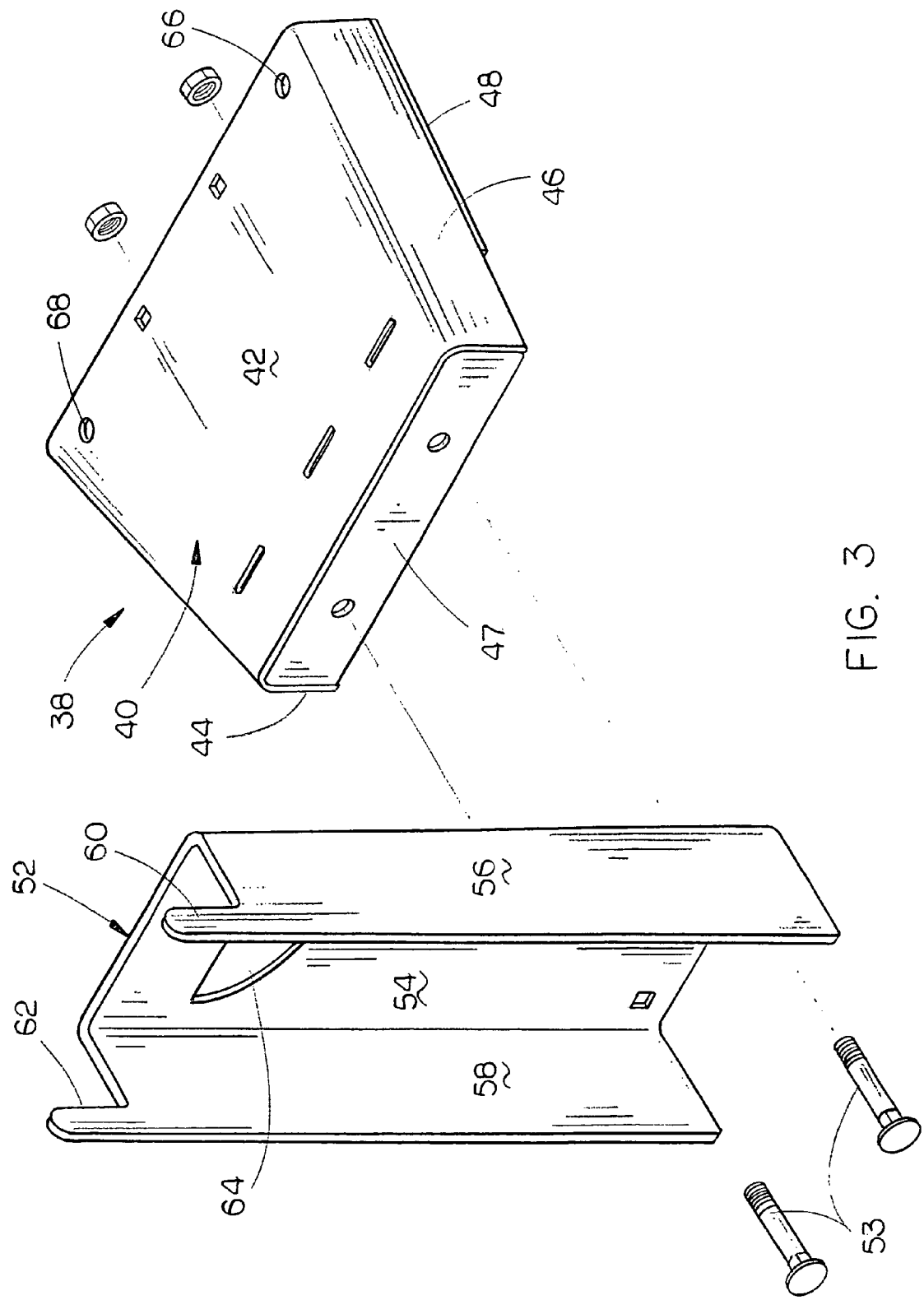
FIG. 3 is an exploded perspective view of the front quick-attach assembly of this invention and the trash receptacle attachment member.
Figure 4:
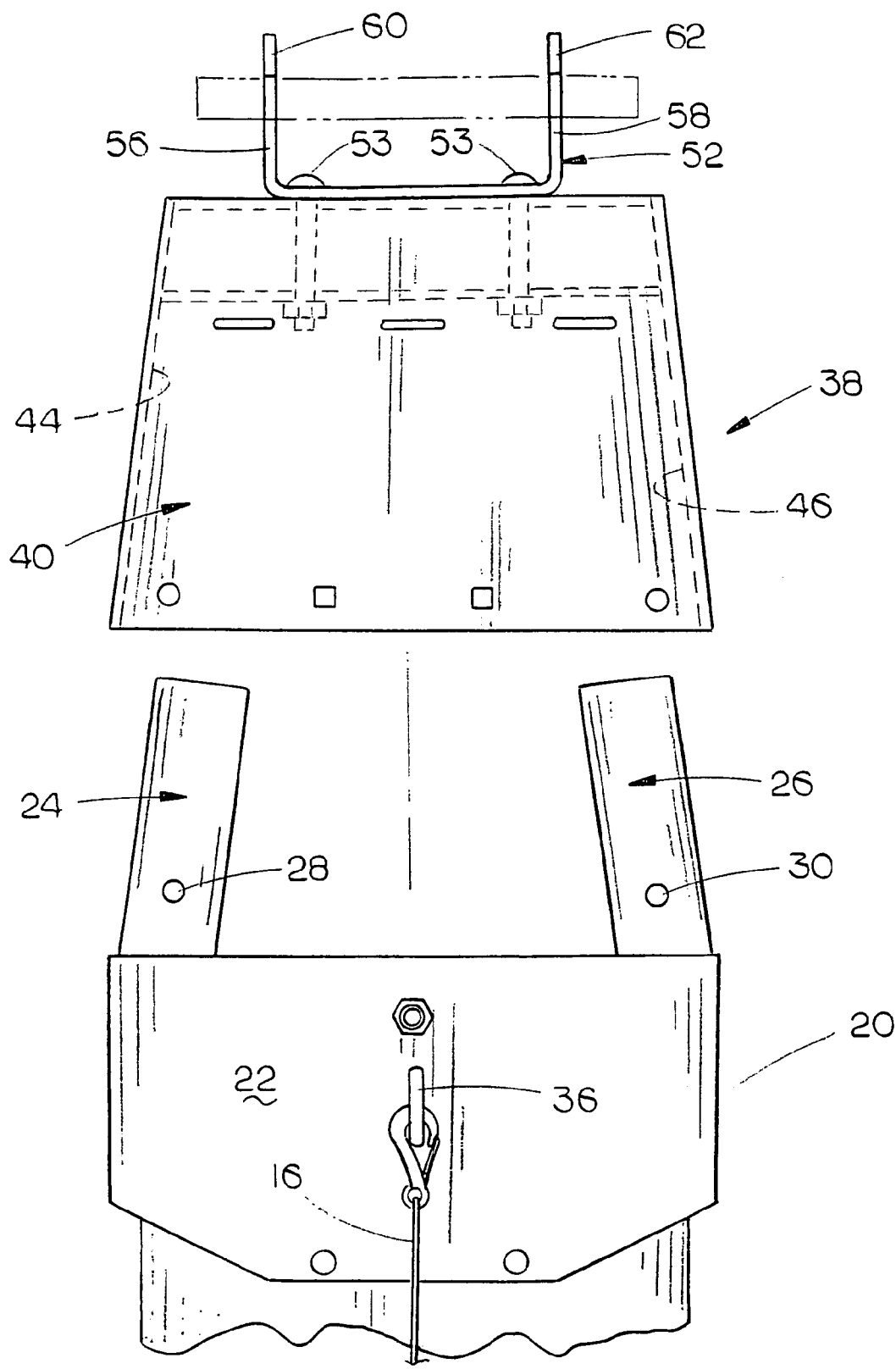
FIG. 4 is a top elevational view of the front and rear quick-attach assemblies and the trash receptacle attachment member.
Figure 5:
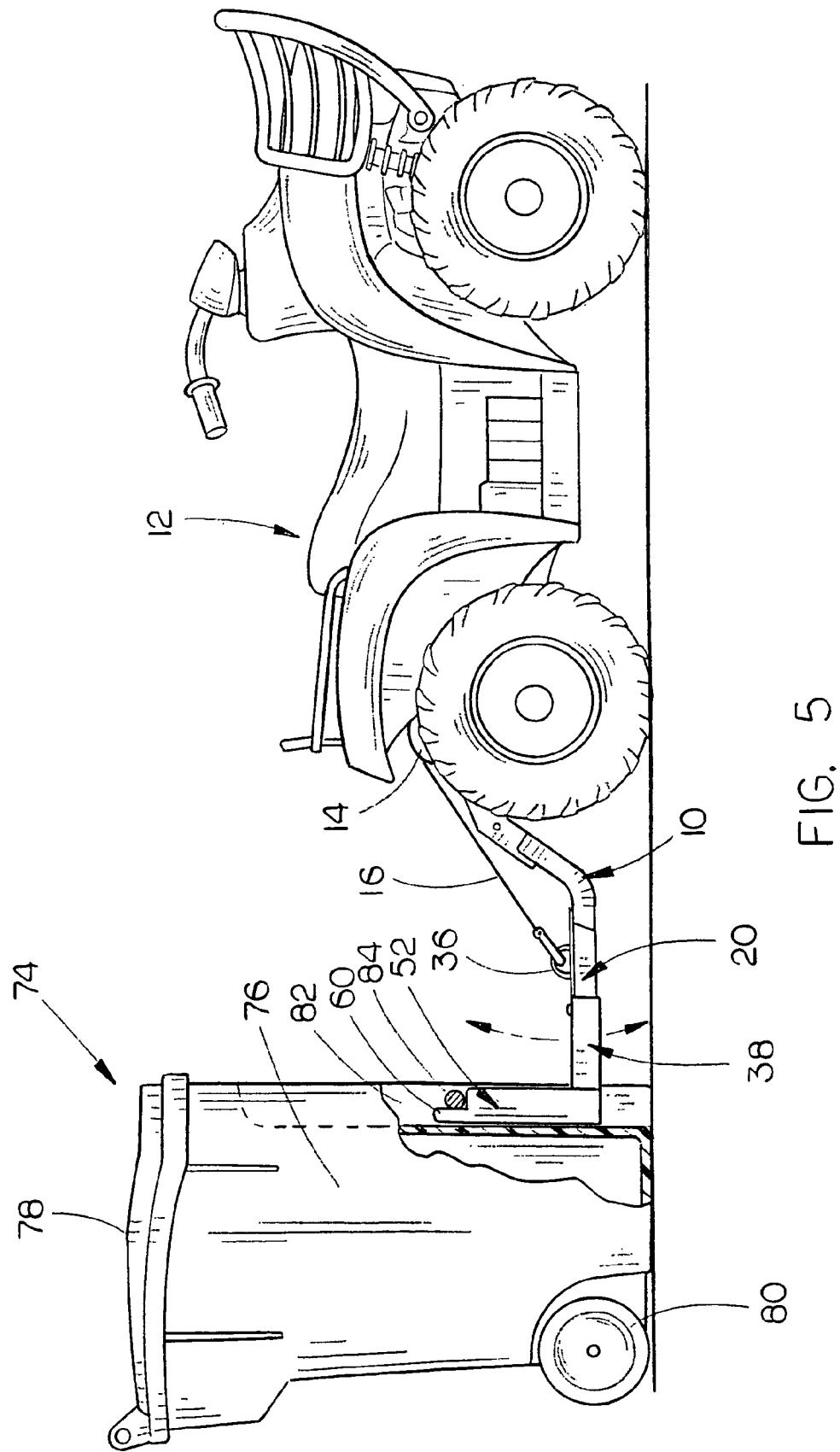
FIG. 5 is a side view illustrating the invention hereof being attached to a trash receptacle with portions of the trash receptacle being cut-away to more fully illustrate the invention.
Figure 6:
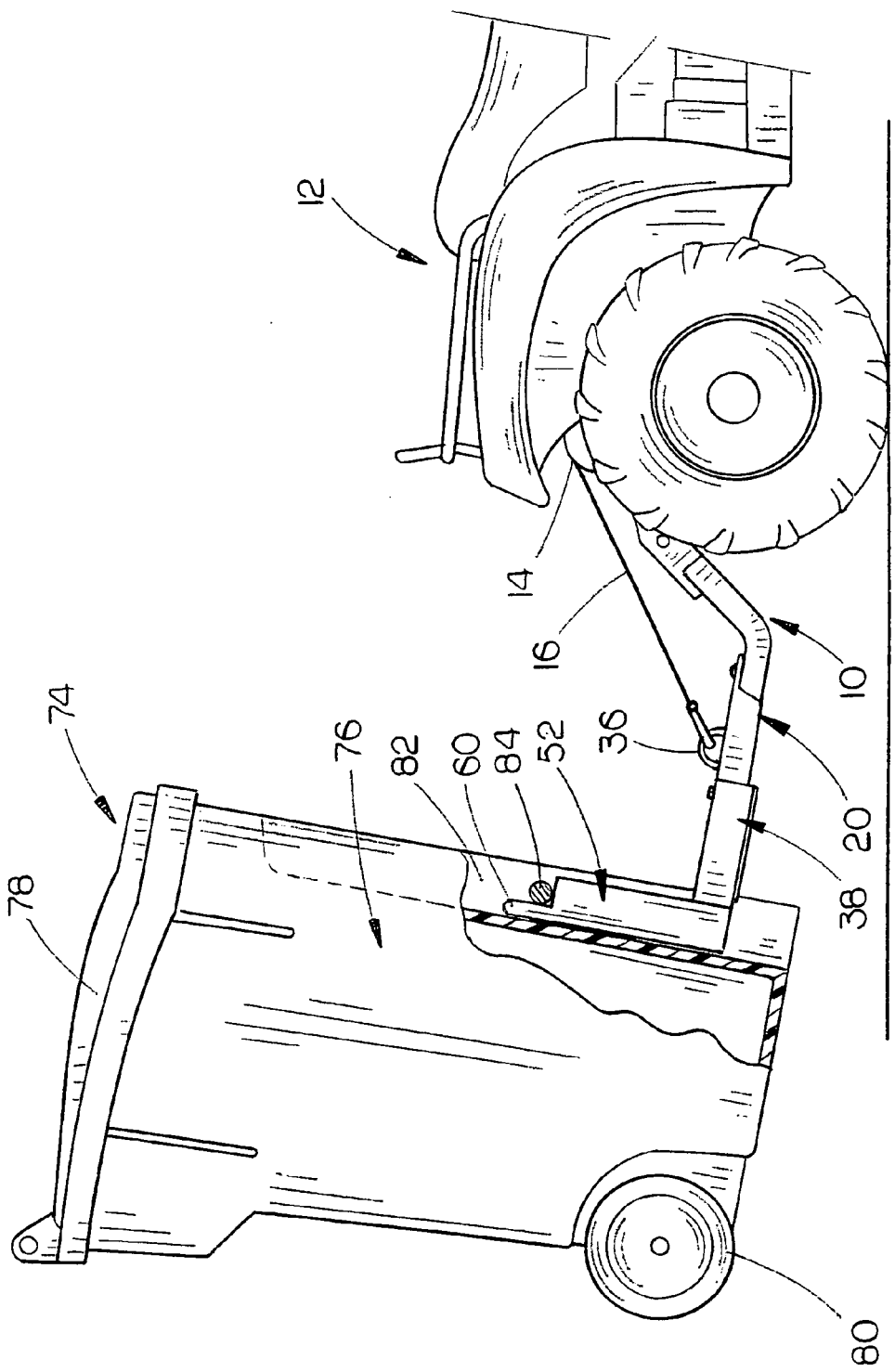
FIG. 6 is a view similar to FIG. 5 but which shows the trash receptacle being raised for transport.

Plate 18 is secured to the rearward end of push tube assembly 10 as seen in the drawings. A front quick-attach assembly 20 is secured to plate 18 by any convenient means such as by bolts or the like. Assembly 20 includes plate portion 22 having tubular members 24 and 26 extending rearwardly therefrom. Each of the tubular members 24 and 26 preferably has a generally inverted channel-shaped cross section. As seen in the drawings, the tubular members 24 and 26 not only extend rearwardly from plate portion 22 but extend laterally inwardly at an angle. Pin openings 28 and 30 are provided in the top walls of tubular members 24 and 26 respectively. As seen in FIG. 2, the rearward ends of the tubular members 24 and 26 have tapered portions 32 and 34 at the rearward ends thereof for facilitating connection with the rear quick-attach assembly. Bracket 36 extends upwardly from plate portion 22 to enable the winch cable 16 to be connected thereto so that the front quick-attach assembly 20 may be raised or lowered with respect to the vehicle.

The numeral 38 refers to a rear quick-attach assembly which includes a box-like housing 40. Housing 40 has a top wall 42, side walls 44 and 46, back wall 47 and bottom wall 48 which define a rearwardly facing pocket 50. Side wall 44 extends forwardly and laterally outwardly from its rearward end to its forward end. Side wall 46 extends forwardly and laterally outwardly from its rearward end to its forward end. The angles of side walls 44 and 46 match the angles of the outer walls of tubular members 24 and 26 respectively.

The numeral 52 refers to a refuse receptacle attachment member which is secured to back wall 47 of housing 40 and which extends upwardly therefrom. Attachment 52 is channel-shaped and has an upstanding front wall 54 and side walls 56 and 58. A finger-like projection 60 extends upwardly from the forward upper end of side wall 56 and a finger-like projection 62 extends upwardly from the forward upper end of side wall 58. Preferably, a hand-hold opening 64 is provided in rear wall 54.

Pin openings 66 and 68 are formed in top wall 42 adjacent the forward end thereof. Pin openings 66' and 68' are formed in bottom wall 48 directly below pin openings 66 and 68. Retainer pins 70 and 72 are adapted to be extended downwardly through the pin openings 66 and 68 respectively through the pin openings 28 and 30 respectively in tubular members 24 and 26 respectively and through the pin openings 66' and 68' in bottom wall 48.

The numeral 74 refers to a conventional trash or refuse receptacle which includes a body portion 76 having a selectable closeable lid 78. Body portion 76 has a pair of wheels 80 rotatably secured to the lower end thereof at the back side of the receptacle 74. A recess 82 is formed in the front side of the receptacle 74 and has a conventional lifting bar 84 positioned therein which is engaged by the lifting mechanism of a refuse or garbage truck to dump the contents of the receptacle into the compaction compartment of the truck.

When it is desired to move the trash receptacle 74 from one location to another, the rear quick-attach assembly 38 is secured to the front quick-attach assembly 20 by driving the vehicle rearwardly with respect to the rear quick-attach assembly 38 so that the tubular members 24 and 26 are received by the pocket 50. The rear quick-attach assembly 38 is secured to the front quick-attach assembly 20 by means of the pins 70 and 72. Alternatively, the rear quick-attach assembly 38 may be simply grasped by an operator by utilizing the hand-hold opening 64 formed therein so that the rear quick-attach assembly 38 may be secured to the front quick-attach assembly 20.

The vehicle is then maneuvered so that the trash container attachment member 52 is received within the recess 82 of the container with the finger-like projections 60 and 62 being positioned below and inwardly of the bar 84. The push tube assembly 10 is then raised through the use of the vehicle winch so that the projections 60 and 62 move upwardly and inwardly of the bar 84 until the bar 84 rests upon the upper ends of the side walls 56 and 58. The entire assembly may then be raised which will cause the trash receptacle 74 to be raised from the ground. The vehicle may then be moved to the point of collection and trash receptacle 74 is deposited at that location. When the trash receptacle has been emptied by the trash collection crew, the off-road vehicle may then be driven to the point of collection and connected to the trash receptacle so that the trash receptacle may be returned to the residence.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An apparatus for moving a trash receptacle with the trash receptacle including a body portion having a front side and a back side with the front side of the body portion having a horizontally disposed lifting bar mounted thereon, comprising: an off-road vehicle having forward and rearward ends; a push tube assembly having forward and rearward ends;

said forward end of said push tube assembly being pivotally secured to said rearward end of said off-road vehicle about a horizontal axis;

a lift mechanism mounted on said off-road vehicle at said rearward end of said off-road vehicle;

said lift mechanism being operatively connected to said push tube assembly for raising and lowering said rearward end of said push tube assembly;

a front quick-attach assembly secured to said push tube assembly for movement therewith;

said front quick-attach assembly including horizontally spaced-apart first and second tubular members, having rearward and forward ends, extending rearwardly therefrom; a rear quick-attach assembly having forward and rearward ends; said rear quick-attach assembly having a forwardly presented box-like pocket adapted to receive said first and second tubular members to enable said front quick-attach assembly to be selectively secured to said rear quick-attach assembly;

a trash receptacle attachment member secured to said rear quick-attach assembly for selective attachment to the lifting bar of the trash receptacle so that upward movement of said rearward end of said push tube assembly by said lift mechanism will cause the trash receptacle to be moved upwardly and so that downward movement of said rearward end of said push tube assembly by said lift mechanism will cause the trash receptacle to be moved downwardly;

wherein said trash receptacle attachment member comprises an upstanding channel-shaped member having upper and lower ends, a front side and a rearward side, said channel-shaped member being secured at its lower end to said rear quick-attach assembly, said channel-shaped member including an upstanding front wall, a first side wall extending transversely from said front wall, a second side wall extending transversely from said front wall, a first upwardly extending projection at the upper end of said first side wall and a second upwardly extending projection at the upper end of said second side wall;

wherein said front wall of said trash receptacle attachment member has a hand receiving opening formed therein to enable a person to grasp said trash receptacle attachment member to raise or lower said rear quick-attach assembly and said trash receptacle attachment member.

2. The apparatus of claim 1 wherein said first and second tubular members extend rearwardly and laterally inwardly from said push tube assembly and wherein said box-like pocket of said rear quick-attach assembly has horizontally spaced-apart and vertically disposed first and second side walls, having forward and rearward ends, which extend forwardly and laterally outwardly from their rearward end to their forward end, the outer sides of said first and second tubular members being closely positioned to the interior surfaces of said first and second side walls of said box-like pocket when said first and second tubular members are received by said box-like pocket.

3. An apparatus for moving a trash receptacle with the trash receptacle including a body portion having a front side and a back side with the front side of the body portion having a horizontally disposed lifting bar mounted thereon, comprising:

an off-road vehicle having forward and rearward ends; a push tube assembly having forward and rearward ends; said rearward end of said push tube assembly being pivotally secured to said forward end of said off-road vehicle about a horizontal axis;

a lift mechanism mounted on said off-road vehicle at said forward end of said off-road vehicle;

said lift mechanism being operatively connected to said push tube assembly for raising and lowering said forward end of said push tube assembly;

a rear quick-attach assembly secured to said push tube assembly for movement therewith;

said rear quick-attach assembly including horizontally spaced-apart first and second tubular members, having rearward and forward ends, extending forwardly therefrom; a front quick-attach assembly having forward and rearward ends;

said front quick-attach assembly having a rearwardly presented box-like pocket adapted to receive said first and second tubular members to enable said rear quick-attach assembly to be selectively secured to said front quick-attach assembly;

a trash receptacle attachment member secured to said front quick-attach assembly for selective attachment to the lifting bar of the trash receptacle so that upward movement of said forward end of said push tube assembly by said lift mechanism will cause the trash receptacle to be moved upwardly and so that downward movement of said forward end of said push tube assembly by said lift mechanism will cause the trash receptacle to be moved downwardly;

wherein said trash receptacle attachment member comprises an upstanding channel-shaped member having upper and lower ends, a front side and a rearward side, said channel-shaped member being secured at its lower end to said front quick-attach assembly, said channel-shaped member including an upstanding rear wall, a first side wall extending transversely from said rear wall, a second side wall extending transversely from said rear wall, a first upwardly extending projection at the upper end of said first side wall and a second upwardly extending projection at the upper end of said second side wall;

wherein said rear wall of said trash receptacle attachment member has a hand receiving opening formed therein to enable a person to grasp said trash receptacle attachment member to raise or lower said front quick-attach assembly and said trash receptacle attachment member.

4. The apparatus of claim 3 wherein said first and second tubular members extend forwardly and laterally inwardly from said push tube assembly and wherein said box-like pocket of said front quick-attach assembly has horizontally spaced-apart and vertically disposed first and second side walls, having forward and rearward ends, which extend forwardly and laterally outwardly from their rearward end to their forward end, the outer sides of said first and second tubular members being closely positioned to the interior surfaces of said first and second side walls of said box-like pocket when said first and second tubular members are received by said box-like pocket.

\* \* \* \* \*